United States Patent
Ito

(10) Patent No.: US 9,069,232 B2
(45) Date of Patent: Jun. 30, 2015

(54) LENS BARRIER UNIT AND IMAGE CAPTURING APPARATUS

(71) Applicant: CANON KABUSHIKI KAISHA, Tokyo (JP)

(72) Inventor: Masato Ito, Kawasaki (JP)

(73) Assignee: CANON KABUSHIKI KAISHA (JP)

( * ) Notice: Subject to any disclaimer, the term of this patent is extended or adjusted under 35 U.S.C. 154(b) by 202 days.

(21) Appl. No.: 13/718,036

(22) Filed: Dec. 18, 2012

(65) Prior Publication Data

US 2013/0162895 A1  Jun. 27, 2013

(30) Foreign Application Priority Data

Dec. 27, 2011  (JP) ................................. 2011-285969

(51) Int. Cl.
| H04N 9/083 | (2006.01) |
| H04N 3/14 | (2006.01) |
| H04N 5/335 | (2011.01) |
| G03B 11/04 | (2006.01) |
| H04N 5/225 | (2006.01) |

(52) U.S. Cl.
CPC ............ G03B 11/043 (2013.01); H04N 5/2251 (2013.01)

(58) Field of Classification Search
None
See application file for complete search history.

(56) References Cited

U.S. PATENT DOCUMENTS

| 5,159,372 A * | 10/1992 | Nomura et al. ............... 396/448 |
| 5,486,889 A * | 1/1996 | Shintani ........................ 396/448 |
| 5,543,881 A * | 8/1996 | Ito ................................. 396/494 |
| 8,687,256 B2 * | 4/2014 | Torii ............................. 359/227 |
| 2005/0025476 A1 * | 2/2005 | Onda ........................... 396/448 |
| 2007/0003273 A1 * | 1/2007 | Yasuda ......................... 396/349 |
| 2007/0160368 A1 * | 7/2007 | Oishi et al. ................... 396/452 |
| 2010/0166415 A1 * | 7/2010 | Kamata ........................ 396/448 |
| 2010/0329663 A1 * | 12/2010 | Hirabayashi .................. 396/448 |
| 2011/0013279 A1 * | 1/2011 | Kang et al. .................... 359/511 |
| 2011/0052182 A1 * | 3/2011 | Uchida et al. ................. 396/448 |
| 2011/0176798 A1 * | 7/2011 | Kuroki .......................... 396/448 |
| 2012/0045198 A1 * | 2/2012 | Miyoshi et al. ............... 396/448 |

FOREIGN PATENT DOCUMENTS

JP  2002-148682 A  5/2002

* cited by examiner

*Primary Examiner* — Sinh Tran
*Assistant Examiner* — Shahbaz Nazrul
(74) *Attorney, Agent, or Firm* — Rossi, Kimms & McDowell LLP

(57) ABSTRACT

A lens barrier unit capable of improving the external force-resistance without increasing the size of the lens barrier unit itself. The lens barrier unit opens/closes an opening portion of a cover member. Each of a first panel member and a second panel member has an opening communicating with the opening portion and a plate-shaped portion for partially defining the opening. A lens barrier member moves between a lens protection position and a lens exposed position. A link member moves a lens barrier member to the lens protection position or the lens exposed position. The lens barrier member and the link member are arranged between the first panel member and the second panel member with the link member located on a side of the second panel member side, and the second panel member and the link member overlap with each other through a static pressure receiving structure.

12 Claims, 6 Drawing Sheets

LENS BARRIER UNIT AND IMAGE CAPTURING APPARATUS

BACKGROUND OF THE INVENTION

1. Field of the Invention

The present invention relates to a lens barrier unit for protecting an image pickup lens, and an image capturing apparatus provided with the lens barrier unit.

2. Description of the Related Art

Image capturing apparatuses such as a digital video camera, a digital still camera, and the like form an image of a subject by an image pickup lens and pick up the image of the subject by an image pickup element arranged behind the image pickup lens. As the image pickup element, a CCD image sensor (Charge Coupled Device Image Sensor), CMOS (Complementary Metal Oxide Semiconductor) image sensor, and the like can be cited, for example. In the recent image capturing apparatuses, a lens barrier mechanism is provided in front of the image pickup lens in order to prevent damage on the image pickup lens and to protect the same.

The lens barrier mechanism opens an optical path and allows a light beam to enter the image pickup lens when shooting and closes the optical path so as to protect the image pickup lens when not shooting. As the lens barrier mechanism, there is known a lens barrier mechanism of a four-blade rotationally movement type in which four lens barrier members 1a, 1b, 1c, and 1d are pivotally moved so that the optical path in front of the image pickup lens 2 can be opened/closed as shown in FIG. 6, for example (see Japanese Laid-Open Patent Publication (Kokai) No. 2002-148682, for example).

However, the lens barrier mechanism in the above-described prior-art technology includes a base member of a ring shape having shafts 3a and 3b at symmetrical positions, the shaft 3a pivotally supporting the lens barrier members 1a and 1b, while the shaft 3b pivotally supporting another lens barrier members 1c and 1d. The above-described technology is configured such that the optical path of an image pickup lens 2 is opened/closed by pivotally moving the four lens barrier members 1a to 1d, which requires to provide a space, in which a shaft for pivotally supporting the respective lens barrier members is installed, at each of the symmetrical positions of the ring-shaped base member, and further requires to provide retreat spaces, to which the lens barrier members 1a to 1d are retreated, in order to open the optical path by pivotally moving the four lens barrier members 1a to 1d. As a result, the lens barrier mechanism itself becomes considerably greater in diameter than the image pickup lens, which provides a problem that a demand for size reduction of the entire image capturing apparatus cannot be met, and moreover no measure is taken against deformation or the like of the lens barrier mechanism when an external force acts thereto, which provides a problem that the external force-resistance is not sufficient.

SUMMARY OF THE INVENTION

The present invention provides a lens barrier unit which is capable of improving the external force-resistance of the lens barrier unit without increasing the size of the lens barrier unit itself, and an image capturing apparatus provided with the same.

In an aspect of the invention, there is provided a lens barrier unit adapted to open or close an opening portion of a cover member disposed in front of an image pickup lens in a direction to an optical axis of the image pickup lens, comprising: a first panel member and a second panel member, each of which having an opening communicating with the opening portion and a plate-shaped portion for partially defining the opening; a lens barrier member adapted to move between a lens protection position where the opening portion is closed and a lens exposed position where the opening position is opened; and a link member adapted to pivotally move around a rotating shaft with one end thereof as a center and to move the lens barrier member to the lens protection position or the lens exposed position, wherein the lens barrier member and the link member are arranged between the first panel member and the second panel member with the link member located on a side of the second panel member side, and the second panel member and the pivotally moving link member overlap with each other through a static pressure receiving structure portion.

With this arrangement, rotation of the link member allows the lens barrier member to move between the lens protection position and the lens exposed position, thereby opening/closing the opening portion, and the static pressure receiving structure portion is formed at a portion where the second panel member and the pivotally moving link member overlap with each other, which improves the external force-resistance of the lens barrier unit without increasing the size of the lens barrier unit itself.

Further features of the present invention will become apparent from the following description of exemplary embodiments with reference to the attached drawings.

BRIEF DESCRIPTION OF THE DRAWINGS

FIGS. 1A and 1B are perspective views showing a digital video camera according to an embodiment of the present invention, in which FIG. 1A shows a state where an image pickup lens is exposed, while FIG. 1B shows a state where the image pickup lens is protected.

FIGS. 2A and 2B are views useful in explaining a lens barrier unit built in the digital video in FIGS. 1A and 1B, in which FIG. 2A is a perspective view, while FIG. 2B is an exploded perspective view.

FIGS. 3A and 3B are front views useful in explaining a static pressure receiving structure portion in the lens barrier unit in FIGS. 2A and 2B with both lens barrier members and a front panel omitted, in which FIG. 3A shows a case in which the upper and lower lens barrier members are in a closed state, not in an open state, and FIG. 3B shows a case in which the upper and lower lens barrier members are in an intermediate state (1) between the open state and the closed state.

FIGS. 4A and 4B are views useful in explaining the lens barrier unit in FIGS. 2A and 2B in a state where the upper and lower lens barrier members are closed, in which FIG. 4A is a front view with the front panel removed, and FIG. 4B is a rear view with a rear panel removed.

FIGS. 5A and 5B are view useful in explaining the lens barrier unit in FIGS. 2A and 2B in a state where an opening is open, in which FIG. 5A is a front view with the front panel removed, and FIG. 5B is a rear view with the rear panel removed.

DESCRIPTION OF THE EMBODIMENTS

The present invention will now be described in detail with reference to the attached drawings.

Figure 1A:
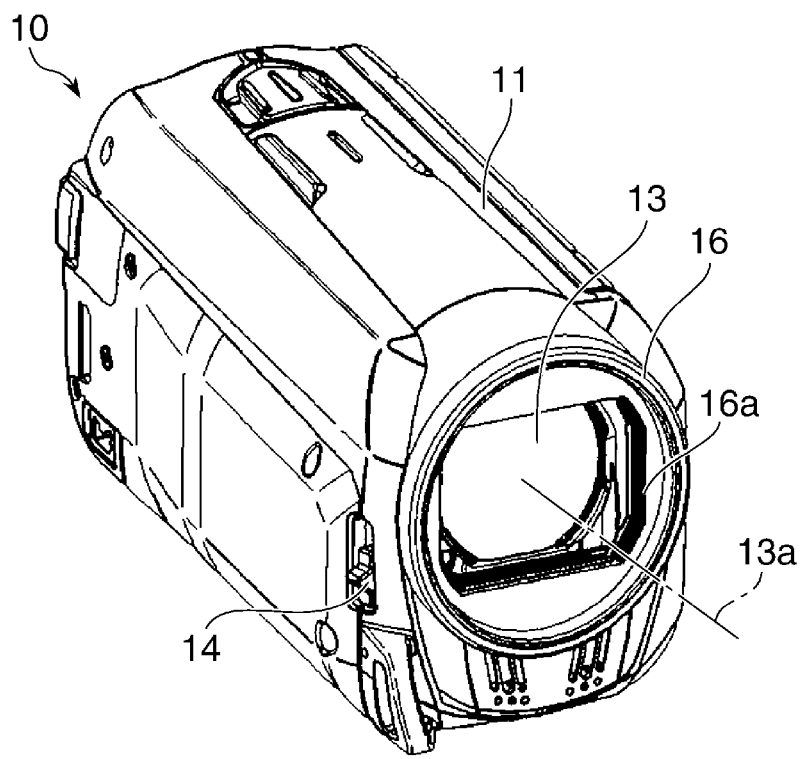
Figure 1B:
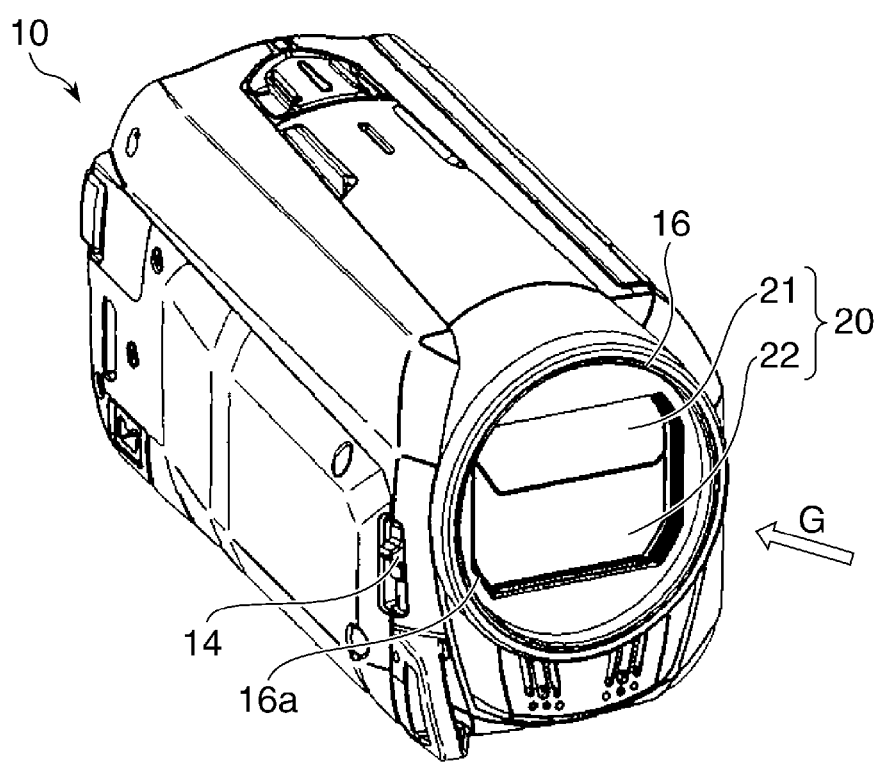

FIGS. 1A and 1B are perspective views showing a digital video camera according to an embodiment of the present invention, in which FIG. 1A shows a state where an image pickup lens is exposed, while FIG. 1B shows a state where the image pickup lens is protected.

In FIGS. 1A and 1B, a digital video camera 10 as an image capturing apparatus is provided with a camera body 11 constituting an exterior. An image pickup lens 13 is incorporated into the camera body 11, and a front cover 16 as a cover member is arranged in front of the image pickup lens 13 in a direction of an optical axis of the image pickup lens 13. In the front cover 16 is formed an opening portion 16a through which a light beam enters the image pickup lens 13 along an optical axis 13a. An image pickup element (not shown) for picking up an image of a subject formed by the image pickup lens 13 is arranged behind the image pickup lens 13 in the direction of the optical axis. The image pickup element comprises a CCD image sensor, a CMOS image sensor, and the like, for example.

The front cover 16 has incorporated thereinto a lens barrier unit 20 for opening/closing the opening portion 16a (see FIG. 1B). The lens barrier unit 20 has therein a lens barrier member for opening/closing the opening portion 16a as viewed from the front of the image pickup lens.

The lens barrier member is composed of an upper lens barrier member (first lens barrier member) 21 covering an upper part of the opening portion 16a and a lower lens barrier member (second lens barrier member) 22 covering a lower part of the opening portion 16a.

The upper and lower lens barrier members 21 and 22 move between a lens protection position where the opening portion is closed (lenses are protected) and a lens exposed position where the opening portion is opened, that is, positioning the upper and lower barrier members 21 and 22 at the lens exposed position puts the opening portion 16a into an open state in which a light beam is allowed to enter the image pickup lens 13 (when shooting) (FIG. 1A), and positioning the upper and lower barrier members 21 and 22 at the lens protection position puts the opening portion 16a into a closed state in which a light beam is not allowed to enter the image pickup lens 13 (when not shooting) (FIG. 1B).

On the camera body 11 is disposed an opening/closing knob 14 as an operation portion for opening/closing the lens barrier unit 20. The opening/closing knob 14 is configured to move vertically in a reciprocal manner with respect to the camera body 11. Moving the opening/closing knob 14 downward as viewed from the front of the image pickup lens 13 allows the upper and lower lens barriers 21 and 22 to move so as to open the opening portion 16a (FIG. 1A). As a result, the light beam enters along the optical axis 13a through the opening portion 16a and reaches the image pickup lens 13, thereby realizing a shootable state. On the other hand, moving the opening/closing knob 14 upward as viewed from the front of the image pickup lens 13 allows the upper and lower lens barrier members 21 and 22 to move so as to close the opening portion 16a (FIG. 1B). Closure of the opening portion 16a realizes a non-shootable state, thereby causing the image pickup lens 13 to be protected.

A description will now be given of an assembling constitution of the lens barrier unit with reference to FIGS. 2A and 2B.

Figure 2A:
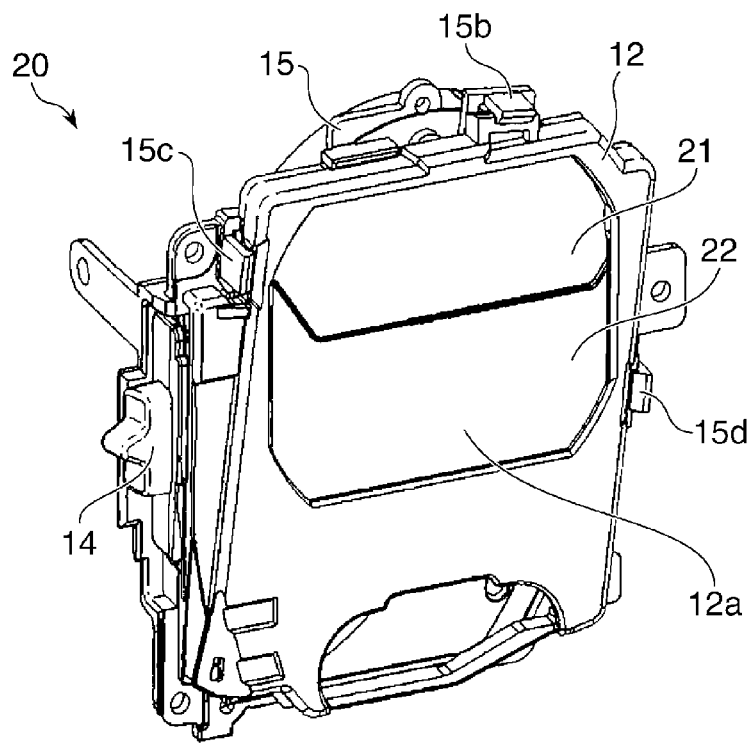
Figure 2B:
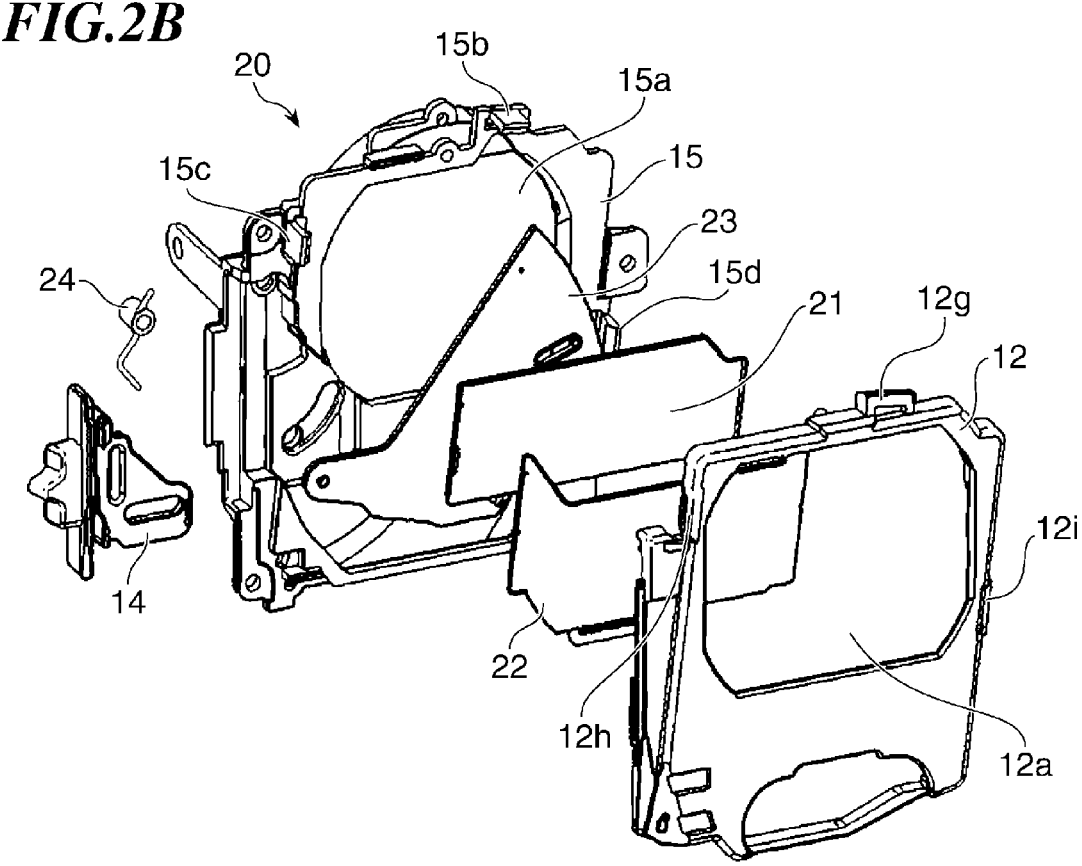

FIGS. 2A and 2B are views useful in explaining a lens barrier unit built in the digital video in FIGS. 1A and 1B, in which FIG. 2A is a perspective view, while FIG. 2B is an exploded perspective view.

In FIGS. 2A and 2B, the lens barrier unit 20 has a front panel 12 as a first panel member forming an outer shape and a rear panel 15 as a second panel member. The upper and lower lens barrier members 21 and 22 and an opening/closing link 23 are disposed between the front panel 12 and the rear panel 15 such that the opening/closing link 23 as a link member is located on a side of the rear panel 15 (on a side of the second panel member). The front panel 12 and the rear panel 15 have substantially rectangular opening 12a and opening 15a through which the light beam enters the image pickup lens 13, respectively, and plate-shaped members for partially defining the opening 12a and the opening 15a, respectively. The opening 12a and the opening 15a communicate with the opening portion 16a of the front cover 16.

In FIG. 2B, the rear panel 15 has engagement pawls 15b to 15d disposed on an upper part and both sides thereof. Moreover, the front panel 12 has engagement surfaces 12g to 12i engaged with the engagement pawls 15b to 15d disposed on an upper part and both sides thereof. When the engagement pawls 15b to 15d of the rear panel 15 are engaged with the engagement surfaces 12g to 12i of the front panel 12, respectively, the rear panel 15 and the front panel 12 are united to each other. The upper and lower lens barrier members 21 and 22, the opening/closing link 23, the opening/closing knob 14, and an urging spring 24 are operably accommodated between the front panel 12 and the rear panel 15, respectively.

In this embodiment, the lens barrier unit 20 has a static pressure receiving structure portion formed at a location thereof where the opening/closing link 23 and the rear panel 15 overlap with each other in order to ensure an external force-resistance, e.g., the external force-resistance with respect to an external force from an arrow G direction in FIG. 1B.

Figure 3A:
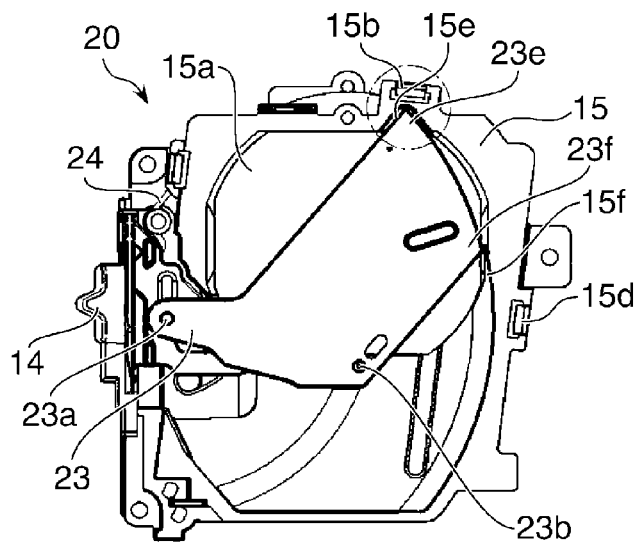
Figure 3B:
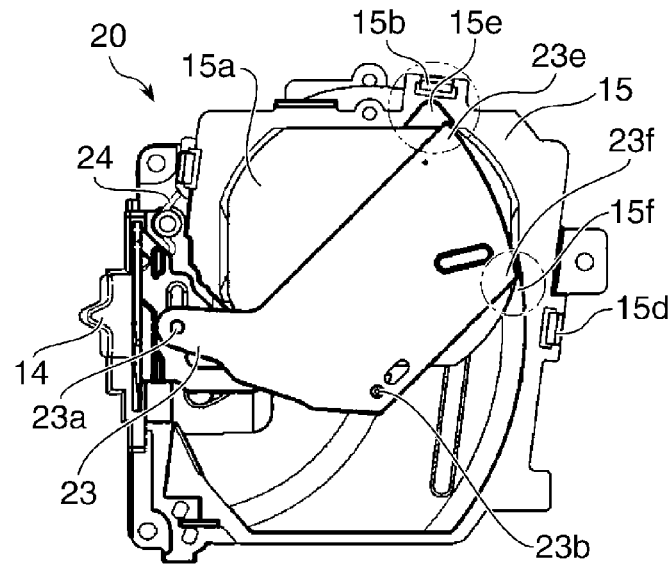
Figure 3C:
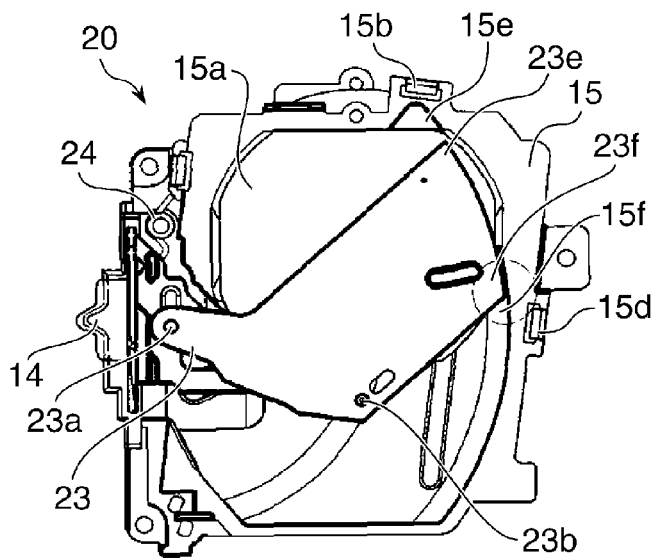
FIG. 3C shows a case in which the upper and lower lens barrier members are in an intermediate state (2) between the open state and the closed state.

FIGS. 3A and 3B are front views useful in explaining the static pressure receiving structure portion in the lens barrier unit in FIGS. 2A and 2B with the both lens barrier members and the front panel omitted, in which FIG. 3A shows a case in which the upper and lower lens barrier members are in a closed state, not in an open state, FIG. 3B shows a case in which the upper and lower lens barrier members are in an intermediate state (1) between the open state and the closed state, and FIG. 3C shows a case in which the upper and lower lens barrier members are in an intermediate state (2) between the open state and the closed state.

In FIG. 3A, the pivotally moving opening/closing link 23 has a first static pressure receiving portion 23e formed at one end of an outer peripheral part thereof, whereas the rear panel 15 has a first static pressure receiving surface 15e corresponding to the first static pressure receiving portion 23e of the opening/closing link 23 formed at an upper part of the opening 15a thereof. The first static pressure receiving portion 23e overlaps with the first static pressure receiving surface 15e in a state where the both lens barriers 21 and 22 close the opening 15a (FIG. 3A). Moreover, assuming that the upper and lower lens barrier members 21 and 22 are provided, the first static pressure receiving portion 23e partially overlaps with the first static pressure receiving surface 15e in an intermediate state where the both lens barrier members 21 and 22 slightly open the opening 15a (FIG. 3B). The overlapping between the first static pressure receiving portion 23e and the first static pressure receiving surface 15e provides a first static pressure receiving structure portion.

Moreover, the pivotally moving opening/closing link 23 has a second static pressure receiving portion 23f formed at the other end of the outer peripheral part thereof, whereas the rear panel 15 has a second static pressure receiving surface 15f formed at a right end portion of the plate-shaped member, opposed to the outer peripheral part of the pivotally moving opening/closing link 23, for partially defining the opening 15a thereof. The second static pressure receiving portion 23f partially overlaps with the second static pressure receiving surface 15f in the intermediate state where the upper lens barrier 21 and the lower lens barrier 22 slightly open the opening 15a (FIG. 3B). Moreover, also in an intermediate state where the opening 15a is further opened (FIG. 3C), the second static pressure receiving portion 23f overlaps with the second static pressure receiving surface 15f. The overlapping between the second static pressure receiving portion 23f and the second static pressure receiving surface 15f provides a second static pressure receiving structure portion is formed.

Since the first and second static pressure receiving structure portions are formed at a location where the opening/closing link 23 and the rear panel 15 overlap with each other, an external force acting onto the lens barrier unit 20 in a G direction in FIG. 1B is received by either one of or by the both of the two static pressure receiving structure portions in collaboration. That is, in all of the state where the opening 15a is closed (FIG. 3A), the intermediate state (1) where slightly opened (FIG. 3B), and the intermediate state (2) where further opened (FIG. 3C), the static pressure receiving portions (23e and 23f) and the static pressure receiving surfaces (15e and 15f) overlap with each other at one or two locations. Therefore, even if the upper and lower lens barrier members 21 and 22 are positioned at any one of the lens protection position, the middle position of the lens protection position and the lens exposed position, and the lens exposed position, the static pressure receiving structure portion functions to exert the external force-resistance. It should be noted that at the lens exposed position in the state where the opening 15a is open, the second static pressure receiving structure portion where the second static pressure receiving portion 23f and the second static pressure receiving surface 15f overlap with each other functions to receive the external force. At this time, the first static pressure receiving portion 23e also overlap with the second static pressure receiving surface 15f. Thus, it is possible to regulate movement of the upper and lower lens barrier members 21 and 22 on a side of the image pickup lens when the external force acts.

The static pressure receiving surfaces 15e and 15f are disposed on the plate-shaped portion of the rear panel 15 for partially defining the opening 15a, and the static pressure receiving portions 23e and 23f are disposed on the outer peripheral part of the link member 23, which eliminates the need for enlarging a panel used for forming the static pressure receiving structure portion, and hence even configuration of the static pressure receiving structure portion prevents the lens barrier unit 20 itself from increasing in size. Moreover, the upper and lower lens barrier members 21 and 22 are not deformed by the static pressure received by the static pressure receiving structure portion to such a degree that causes trouble, thereby enabling an opening/closing operation of the opening portion 16a to be performed stably.

In this embodiment, an opening/closing guide as a guide member for movably guiding the upper and lower lens barrier members 21 and 22 is inclined around the optical axis 13a by a predetermined angle θ or 5 to 15°, for example, or preferably 7°.

Figure 4A:
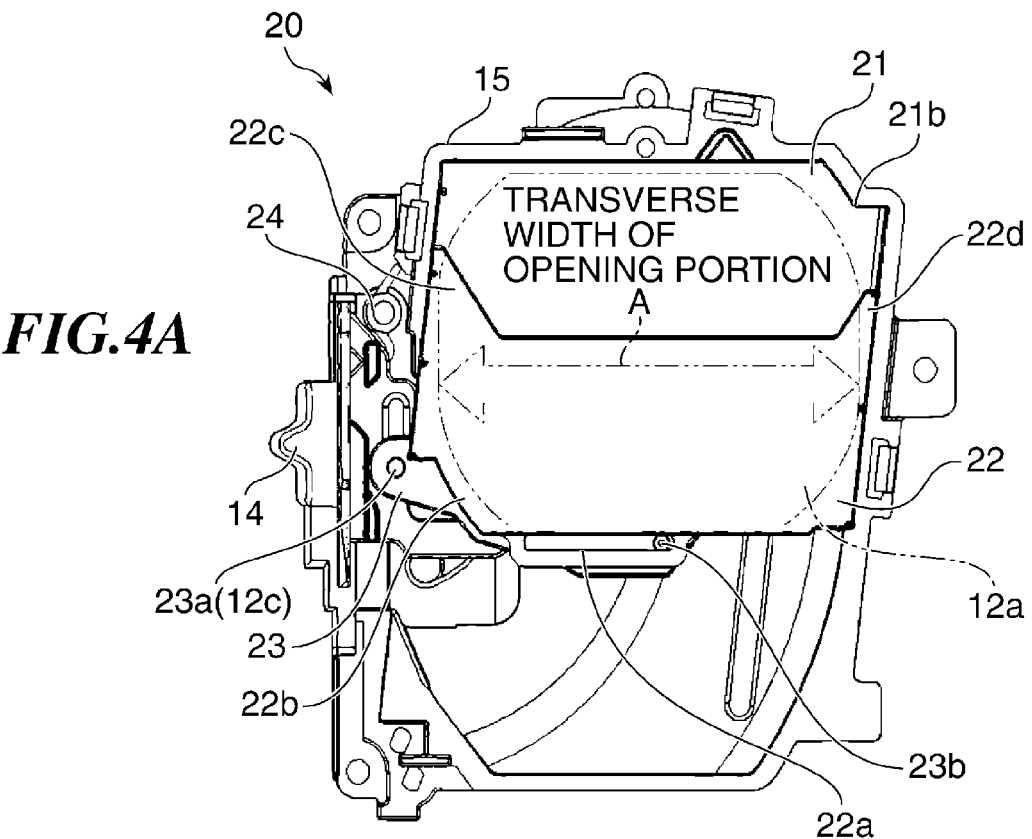
Figure 4B:
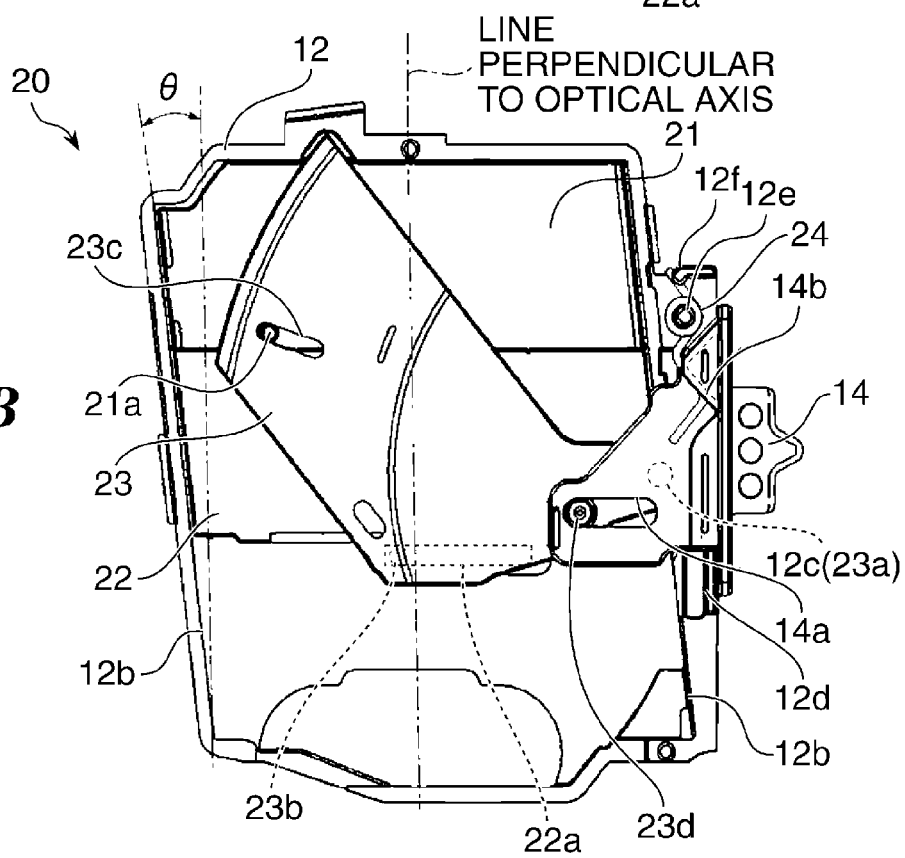

FIGS. 4A and 4B are views useful in explaining the lens barrier unit in FIGS. 2A and 2B in the state where the upper and lower lens barrier members are closed, in which FIG. 4A is a front view with the front panel removed, and FIG. 4B is a rear view with the rear panel removed.

In FIGS. 4A and 4B, the front panel 12 has opening/closing guides 12b positioned on a plane intersecting the optical axis 13a perpendicularly, for example, and inclined around the optical axis by a predetermined angle θ, e.g., 7°. The opening/closing guides 12b are disposed on the both right and left sides of the opening 12a, respectively (see FIG. 4B). The opening/closing guides 12b movably support the upper lens barrier member 21 and the lower lens barrier member 22.

Each of the upper lens barrier member 21 and the lower lens barrier member 22 movably supported by the opening/closing guides 12b is composed of a parallelogram-shaped plate-shaped body having two sides in parallel with each other along inclined surfaces of the opening/closing guides 12b, respectively. In an acute angle portion of the upper lens barrier member 21 at an upper thereof and an acute angle portion of the lower lens barrier member 22 at a lower part thereof are disposed notch portions 21b and 22b, respectively. This decreases the size of the lens barrier unit. The parallelogram shape, in this embodiment, is not a mathematical concept, but a concept including a shape of a substantial parallelogram considered to be a parallelogram at a glance. Use of a parallelogram shape enables the upper lens barrier member 21 and the lower lens barrier member 22 to move between the open state and the closed state along the inclined surfaces of the opening/closing guides 12b.

In this embodiment, a biting preventing structure is employed in order to smoothen the moving operation of the upper and lower lens barrier members 21 and 22.

Figure 5A:
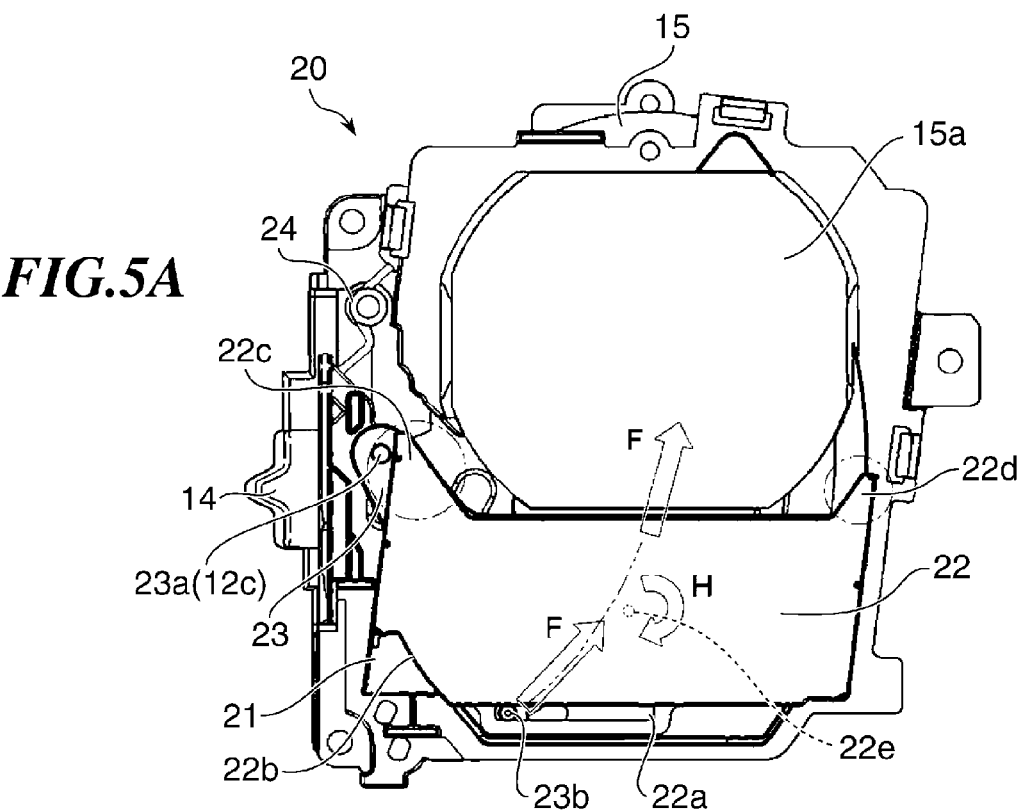
Figure 5B:
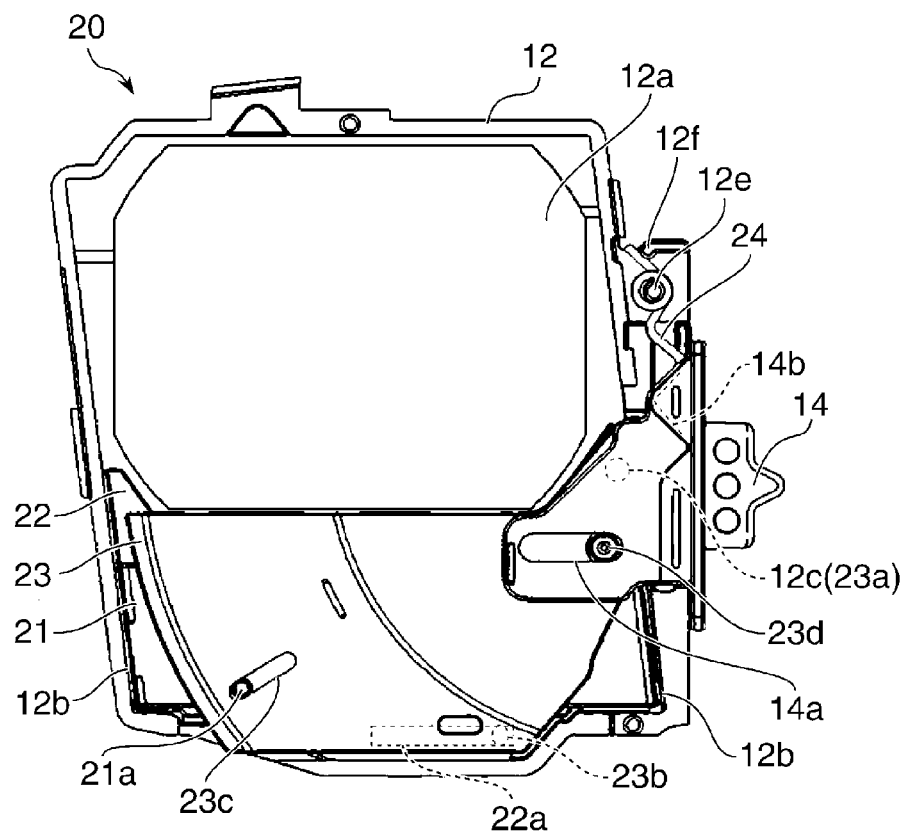
Figure 6:
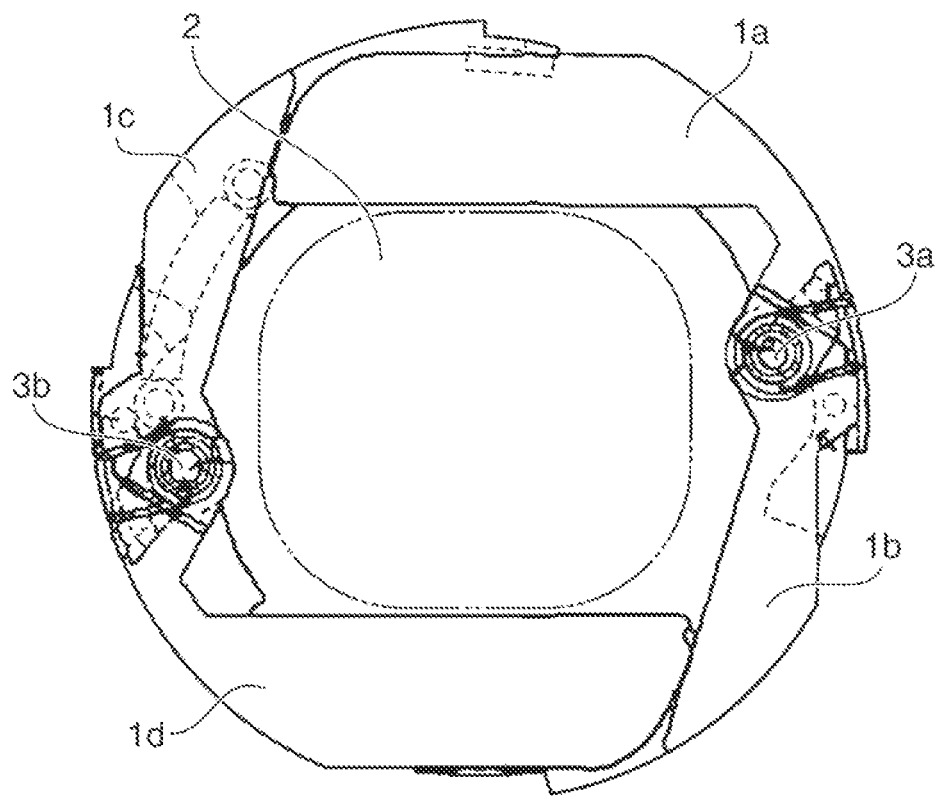
FIG. 6 is a view useful in explaining a prior-art lens barrier mechanism of a four-blade rotationally moving type.

FIGS. 5A and 5B are views useful in explaining the lens barrier unit in FIGS. 2A and 2B in the state where the opening is open, in which FIG. 5A is a front view with the front panel removed, and FIG. 5B is a rear view with the rear panel removed.

In FIG. 5A, the lower lens barrier member 22 has, at the obtuse angle portion or at an upper left part in the upper part thereof, a triangular extension portion 22c extending in a moving direction (upward direction) when the opening 15a (12a) is closed. Moreover, the lower lens barrier member 22 has, at the acute angle portion or at an upper right part in the upper part thereof, an extension portion 22d extending in the moving direction (upward direction) when the opening 15a (12a) is closed. The extension portion 22d is smaller than the extension portion 22c. The "triangular" shape, in this embodiment, is not a mathematical concept but a concept including a substantially triangular shape considered to be a triangle at a glance.

Provision of the extension portions 22c and 22d prevents biting of the lens barrier members 21 and 22, thereby enabling the upper and lower lens barrier members 21 and 22 to smoothly perform the opening/closing operation of the opening 15a (12a), and ensuring the strength of the lower lens barrier member 22.

A description will now be given of the reason why the extension portion 22d is smaller than the extension portion 22c.

In FIG. 5A, the opening/closing link 23 rotates around a rotating shaft 12c counterclockwise, when moving from the lens exposed position where the opening 15a (12a) is open to the lens protection position where the opening 15a (12a) is closed. Thus, a diagonally upper right force F acts on a guide hole 22a of the lower lens barrier member 22 engaged with an operation boss 23b, thereby causing the lower lens barrier member 22 to be lifted up. This allows the lower lens barrier member 22 to be lifted up with the left end of the guide hole 22a as an acting point, thereby causing the lower lens barrier member 22 to rotate in a direction of an arrow H with a gravity center 22e of the lower lens barrier member 22 as a fulcrum. Thus, a contact force between the extension portion 22d of the upper part acute angle portion of the lower lens barrier member 22 and the opening/closing guide 12b becomes larger, thereby causing larger friction resistance to be generated in the extension portion 22d, as an attracting portion, moving against the gravity than in the extension portion 22c of the upper part obtuse angle portion. Therefore, the extension portion 22d requires strength against the large friction-resistance, while also requiring a function of preventing the biting with the upper lens barrier member 21 and ensuring a smooth opening/closing operation. Thus, the extension portion 22d is formed in a substantially triangular shape smaller than the extension portion 22c, whereby the biting of the upper and lower lens barrier members 21 and 22 is prevented and the opening/closing operation is smoothened, and at the same time, the strength is ensured. Moreover, the extension portions 22c and 22d retreat so as not to overlap the opening 15a of the rear panel 15 at the lens exposed position where the opening 15a (12a) is opened, which provides no factor of increasing the size of the lens barrier unit 20.

A description will now be given in detail of an engagement state between the upper and lower lens barrier members 21 and 22, and the opening/closing link 23 and a function of the opening/closing link 23, with reference to FIG. 4B.

In FIG. 4B, a rotation hole 23a is disposed in the opening/closing link 23 close to the right side in FIG. 4B, and the rotation hole 23a is engaged with the rotating shaft 12c disposed at the center part on the right side of the frame body portion in the front panel 12 in FIG. 4B, which makes the opening/closing link 23 pivotally movable around the rotating shaft 12c engaged with the rotation hole 23a.

Moreover, at the center of the frame body portion on the right side in the front panel 12 in FIG. 4B is disposed an opening/closing knob guide 12d, and the opening/closing knob 14, as an operation portion of the upper and lower lens barrier members 21 and 22 moves vertically along the opening/closing knob guide 12d, when operated.

In the vicinity of a left end portion of the opening/closing link 23 is disposed a ling hole 23c with which an opening/closing boss 21a disposed at a lower left part of the upper lens barrier member 21 is engaged. Moreover, the operation boss 23b is disposed at the lower center part of the opening/closing link 23 in FIG. 4B, and this operation boss 23b is engaged with a guide hole 22a of a horizontally elongated shape formed in a lower part of the lower lens barrier member 22. Furthermore, an operation hole 14a of a horizontally elongated shape is formed at a left side of the opening/closing knob 14 in FIG. 4B, and the operation boss 23d disposed in the vicinity of the right end portion of the opening/closing link 23 is engaged with this operation hole 14a.

As described above, in the lens barrier unit 20, with which the upper and lower lens barrier members 21 and 22, the opening/closing link 23, and the opening/closing knob 14 are linked, is disposed the urging spring 24, in order to maintain the open/closed states of the upper and lower lens barrier members 21 and 22.

That is, as shown in FIG. 4B, a spring receiver 14b is formed for receiving the urging spring 24 in an upper part of the opening/closing knob 14, and a spring fixing shaft 12e and a spring fixing portion 12f for fixing the urging spring 24 are formed in an upper left portion (frame body portion) of the front panel 12.

The urging spring 24 is fitted with the spring fixing shaft 12e, and further is attached to the spring receiver 14b at one end thereof and attached to the spring fixing portion 12f at the other end thereof. The urging spring 24 urges the opening/closing knob 14 in a direction to maintain the open state when the opening 15a (12a) is opened by operating the opening/closing knob 14 and urges the opening/closing knob 14 in a direction to maintain the closed state when the opening 15a (12a) is closed. Therefore, urging of the urging spring 24 allows the upper lens barrier member 21 and the lower lens barrier member 22 to maintain the closed state or the open state of the opening 15a (12a) until the opening/closing knob 14 is operated.

A description will now be given of an operation of the lens barrier unit 20 having the above-described configuration.

First, if an opening portion 16a (openings 12a and 15a) of the front cover 16 in the closed state is to be opened by operating the lens barrier unit 20, the opening/closing knob 14 is moved downward in FIG. 4B.

Downward movement of the opening/closing knob 14 lowers the operation boss 23d of the opening/closing link 23 engaged with the operation hole 14a of the opening/closing knob 14 to cause the opening/closing link 23 to be pivotally moved counterclockwise around the rotating shaft 12c in FIG. 4B. Thus, the opening/closing boss 21a of the upper lens barrier member 21 engaged with the link hole 23c of the opening/closing link 23 is moved downward, and moreover, the guide hole 22a of the lower lens barrier 22 engaged with the operation boss 23b is moved downward. Accordingly, the upper lens barrier member 21 and the lower lens barrier member 22 are moved to the retreated positions below along the opening/closing guide 12b and enter the lens exposed state where the opening 15a (12a) is open (see FIG. 5B).

At this time, if the opening/closing knob 14 is operated to be moved downward in a state where the opening is closed, operation of the urging spring 24 allows the spring receiver 14b of the opening/closing knob 14 to be moved downward, thereby increasing the urging force of the opening/closing knob 14 by the urging spring 24 in such a direction as that the opening 15a (12a) is once closed. However, if the opening/closing knob 14 is further moved downward, the urging spring 24 exerts the largest urging force at a top part of the spring receiver 14b. Then, if the opening/closing knob 14 is further moved downward, the urging force of the opening/closing knob 14 by the urging spring 24 is reversed in such a direction as that the upper and lower lens barrier members 21 and 22 open the opening 15a (12a). Accordingly, when the opening 15a (12a) is to be opened by moving the upper lens barrier member 21 and the lower lens barrier member 22, a clear click feeling can be obtained.

In the state where the opening 15a (12a) is opened, the upper and lower lens barrier members 21 and 22 are fully overlapped on the plate-shaped portion below the opening 15a (12a) and also are pivotally moved to a position where the opening/closing link 23 is hidden below the opening 15a (12a). Accordingly, a retreating space of the upper and lower lens barrier members 21 and 22, and the opening/closing link 23 can be ensured by a space for just one lens barrier member, thereby reducing the size of the lens barrier unit 20.

A description will now be made of an operation to close the opening 15a (12a) in the open state.

When the opening portion 16a (openings 12a and 15a) of the front cover 16 in an open state is to be closed by operating the lens barrier unit 20, the opening/closing knob 14 is moved upward in FIG. 4B.

If the opening/closing knob 14 is moved upward, the operation boss 23d of the opening/closing link 23 engaged with the operation hole 14a of the opening/closing knob 14 is raised, and the opening/closing link 23 is pivotally moved clockwise around the rotating shaft 12c in FIG. 4B. At this time, the opening/closing boss 21a of the upper lens barrier 21 engaged with the link hole 23c of the opening/closing link 23 is moved upward, and the guide hole 22a of the lower lens barrier 22 engaged with the operation boss 23b is moved upward. Accordingly, the upper lens barrier member 21 and the lower lens barrier member 22 are moved upward along the opening/closing guide 12b, to close the opening 15a (12a).

At this time, if the opening/closing knob 14 is operated and moved upward in a state where the opening is open, the spring receiver 14b of the opening/closing knob 14 is moved upward due to an action of the urging spring 24, and the urging force of the opening/closing knob 14 by the urging spring 24 increases once in such a direction as that the opening 15a (12a) is opened. However, if the opening/closing knob 14 is further moved upward, the urging spring 24 exerts the largest urging force at a top part of the spring receiver 14b. Then, if the opening/closing knob 14 is further moved upward, the urging force of the opening/closing knob 14 by the urging spring 24 is reversed in such a direction as that the upper and lower lens barrier members 21 and 22 close the opening. Accordingly, when the opening 12a (15a) is to be closed by moving the upper lens barrier member 21 and the lower lens barrier member 22, a clear click feeling can be obtained.

According to this embodiment, since the static pressure receiving structure portion is formed on a portion where the rear panel 15 and the pivotally moving opening/closing link 23 overlap with each other, an external force acting from, e.g., the G direction in FIG. 1B is received by the static pressure receiving structure portion, which regulates the movement of the upper and lower lens barrier members 21 and 22 on a side of the image pickup lens 13, for example. The static pressure receiving structure portion is formed in all the states, that is, the state where the opening 15a is closed (FIG. 3A), the open intermediate states (1) (FIG. 3B) and (2) (FIG. 3C), and a released state, which regulates the movement of the upper and lower lens barrier members 21 and 22 on a side of the image pickup lens 13 by the external force, regardless of the positions of the upper and lower lens barrier members 21 and 22.

According to this embodiment, since the lens barrier unit 20 has the opening/closing guide 12b inclined around the optical axis of the image pickup lens by the predetermined angle θ, a gap is formed between the lens barrier unit 20 and the opening portion 16a of the front cover 16, which enables the gap to have arranged therein constituent members, such as the urging spring 24, a flexible printed board (FPC) for a panel member and the like, and hence reduces the size of the lens barrier unit 20 without disturbing the opening/closing operation of the lens barrier unit. Particularly, provision of the notch portions 21b and 22b in the acute angle portion in the upper part of the upper lens barrier member 21 and the acute angle portion in the lower part of the lower lens barrier member 22, respectively, reduces a transverse width (horizontal direction) of the lens barrier unit 20 down to approximately a diameter of the image pickup lens, thereby realizing the size reduction.

According to this embodiment, since the lens barrier member is composed of two of the upper and lower lens barrier members, when the opening 15a (12a) is to be opened, both of the upper and lower lens barrier members 21 and 22 can fully overlap with each other in the retreated state. This reduces the vertical dimension of the retreating space down to a dimension of approximately a vertical length of either one of them, thereby reducing the size of the lens barrier unit 20, which enables a demand for the size reduction of the image capturing apparatus to be met.

According to this embodiment, the notch portions 21b and 22b are disposed in the upper and lower lens barrier members 21 and 22, respectively, which reduces the transverse widths (horizontal direction) of the upper and lower lens barrier members 21 and 22 down to approximately a transverse width of the opening 12a indicated by an arrow A in FIG. 4A.

According to this embodiment, the extension portions 22c and 22d extending in the moving direction when the opening portion is closed are disposed in the upper-part obtuse angle portion and the upper-part acute angle portion in the lower lens barrier member 22, which enables the strength of the lower lens barrier 22 to be ensured with the opening/closing operation of the lower lens barrier 22 smoothly performed.

In this embodiment, the lens barrier member is composed of two of the upper lens barrier member 21 and the lower lens barrier member 22, but the number of the lens barrier members is not limited to two, but three or more lens barrier members may be used within a range not prejudicial to the opening/closing operation. Moreover, the inclination angle around the optical axis in the opening/closing guide 12b as the guide member is not particularly limited but can be suitably selected within a range of practical use.

The present invention has been described in detail by using the embodiment but is not limited to this embodiment.

Aspects of the present invention can also be realized by a computer of a system or apparatus (or devices such as a CPU or MPU) that reads out and executes a program recorded on a non-transitory memory device to perform the functions of the above-described embodiment(s), and by a method, the steps of which are performed by a computer of a system or apparatus by, for example, reading out and executing a program recorded on a non-transitory memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-285969 filed Dec. 27, 2011, which is hereby incorporated by reference herein in its entirety.

What is claimed is:

1. A lens barrier unit adapted to open or close an opening portion of a cover member disposed in front of an image pickup lens in a direction of an optical axis of the image pickup lens, comprising:

a first panel member and a second panel member, each of which having an opening communicating with said opening portion and a plate-shaped portion for partially defining the opening;

a lens barrier member adapted to move between a lens protection position where said opening portion is closed and a lens exposed position where said opening position is opened; and a link member adapted to pivotally move around a shaft with one end thereof as a center and to move said lens barrier member to said lens protection position or said lens exposed position, wherein said lens barrier member and said link member are arranged between said first panel member and said second panel member with said link member located on a side of said second panel member side, said second panel member and said link member overlap with each other through a static pressure receiving structure portion, and said static pressure receiving structure portion includes a first static pressure receiving structure portion comprising a first static pressure receiving surface disposed on an upper part of said opening of said second panel member and a first static pressure receiving portion disposed at one end of an outer peripheral part of said link member so as to oppose to said first static pressure receiving surface, and a second static pressure receiving structure portion comprising a second static pressure receiving surface disposed on the plate-shaped portion of said second panel member and a second static pressure receiving portion disposed at the other end of the outer peripheral part of said link member so as to oppose to said second static pressure receiving surface.

2. The lens barrier unit according to claim 1, wherein said first static pressure receiving structure portion regulates movement of said lens barrier member on a side of said image pickup lens at the lens protection position and said second static pressure receiving structure portion regulates movement of said lens barrier member on a side of said image pickup lens at the lens exposed position.

3. The lens barrier unit according to claim 1, wherein said first static pressure receiving structure portion and said second static pressure receiving structure portion regulates movement of said lens barrier member on a side of said image pickup lens in association with each other.

4. The lens barrier unit according to claim 1, wherein said second panel member has engagement pawls formed adjacent to the first static pressure receiving surface and the second static pressure receiving surface, respectively, and said first panel member has engagement surfaces formed so as to oppose to the engagement pawls, respectively, and
said first panel member and said second panel member are united to each other due to engagement between said engagement pawls and said engagement surfaces.

5. A lens barrier unit adapted to open or close an opening portion of a cover member disposed in front of an image pickup lens in a direction of an optical axis of the image pickup lens, comprising:
a first panel member and a second panel member, each of which having an opening communicating with said opening portion and a plate-shaped portion for partially defining the opening;
a lens barrier member adapted to move between a lens protection position where said opening portion is closed and a lens exposed position where said opening position is opened; and
a link member adapted to pivotally move around a shaft with one end thereof as a center and to move said lens barrier member to said lens protection position or said lens exposed position, wherein
said lens barrier member and said link member are arranged between said first panel member and said second panel member with said link member located on a side of said second panel member side,
said second panel member and said link member overlap with each other through a static pressure receiving structure portion, and
said first panel member has a guide member inclined around said optical axis by a predetermined angle, and said lens barrier member moves along said guide member.

6. A lens barrier unit adapted to open or close an opening portion of a cover member disposed in front of an image pickup lens in a direction of an optical axis of the image pickup lens, comprising:
a first panel member and a second panel member, each of which having an opening communicating with said opening portion and a plate-shaped portion for partially defining the opening;
a lens barrier member adapted to move between a lens protection position where said opening portion is closed and a lens exposed position where said opening position is opened; and
a link member adapted to pivotally move around a shaft with one end thereof as a center and to move said lens barrier member to said lens protection position or said lens exposed position, wherein
said lens barrier member and said link member are arranged between said first panel member and said second panel member with said link member located on a side of said second panel member side,
said second panel member and said link member overlap with each other through a static pressure receiving structure portion,
said lens barrier member is composed of a first lens barrier member covering an upper side part of said opening portion and a second lens barrier member covering a lower side part of said opening portion, and
said link member moves said first lens barrier member and said second lens barrier member in the same direction so as to open and close said opening.

7. The lens barrier unit according to claim 6, wherein each of said first lens barrier member and said second lens barrier member comprises a plate-shaped body of a parallelogram shape having two sides in parallel with each other along an inclined guide member, and a notch portion disposed on each of an acute angle portion of said first lens barrier member at an upper part thereof and an acute angle portion of said second lens barrier member at a lower part thereof.

8. The lens barrier unit according to claim 7, wherein said second lens barrier member has extension portions of a triangular shape extending in such a direction as that the opening portion is closed is formed in each of an upper-part obtuse angle portion and the upper-part acute angle portion thereof, and the extension portion for said upper-part acute angle portion is smaller than the extension portion for said upper-part obtuse angle portion.

9. The lens barrier unit according to claim 6, further comprising an operation portion adapted to operate said link member, wherein
said link member has an operation hole engaged with a shaft disposed on said first panel member, an operation boss engaged with the operation hole disposed in said operation portion, a link hole engaged with an opening/closing boss disposed on said first lens barrier member, and an operation boss engaged with a guide hole disposed in said second lens barrier member, said link member pivotally moving around the shaft to move said first lens barrier member and said second lens barrier member to the lens protection position or the lens exposed position when said operation portion is operated.

10. The lens barrier unit according to claim 5, wherein a constituent member of said lens barrier unit is disposed in a gap between the guide member inclined around said optical axis by a predetermined angle and the opening portion.

11. The lens barrier unit according to claim 10, wherein the constituent member is a flexible printed board (FPC) for said panel member.

12. An image capturing apparatus comprising a camera body, an image pickup lens incorporated into the camera body, and the lens barrier unit according to claim 1.

* * * * *